Figure 8:
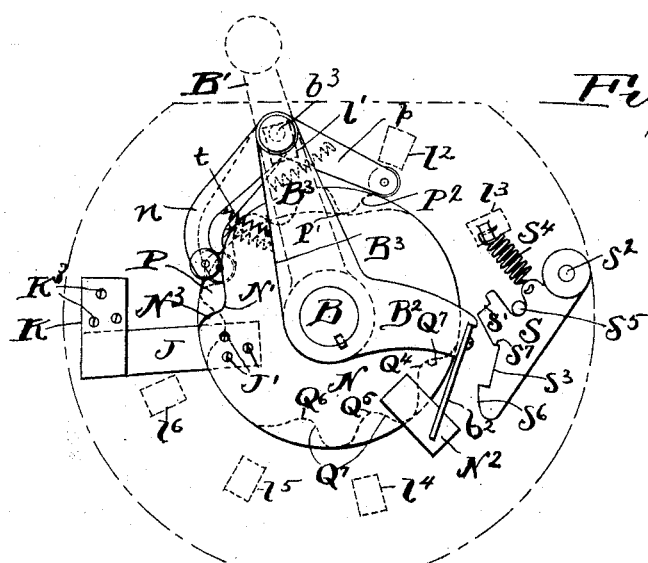
Figure 9:
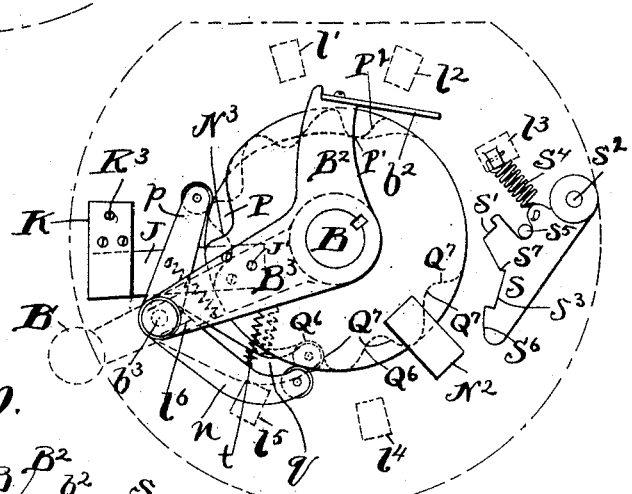

No. 629,398.  
S. H. SHORT.  
CONTROLLER FOR ELECTRIC MOTOR CARS OR VEHICLES.  
(Application filed Mar. 2, 1895.)  
(No Model.) Patented July 25, 1899.  
4 Sheets—Sheet 1.
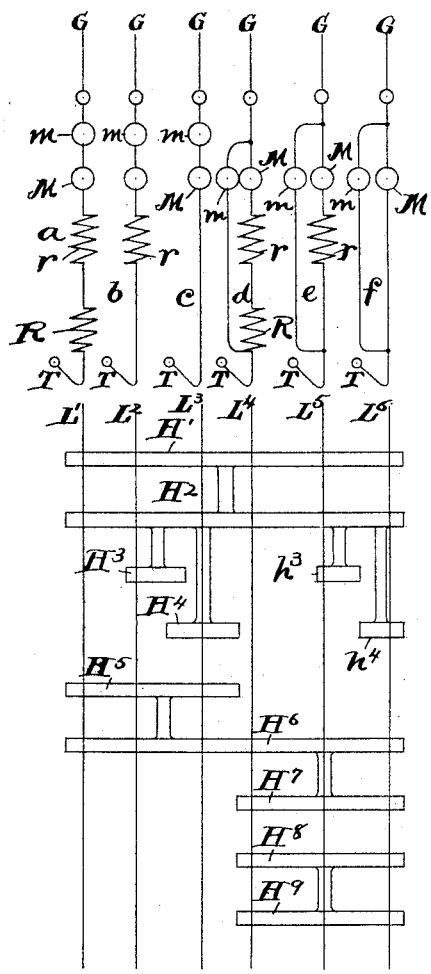
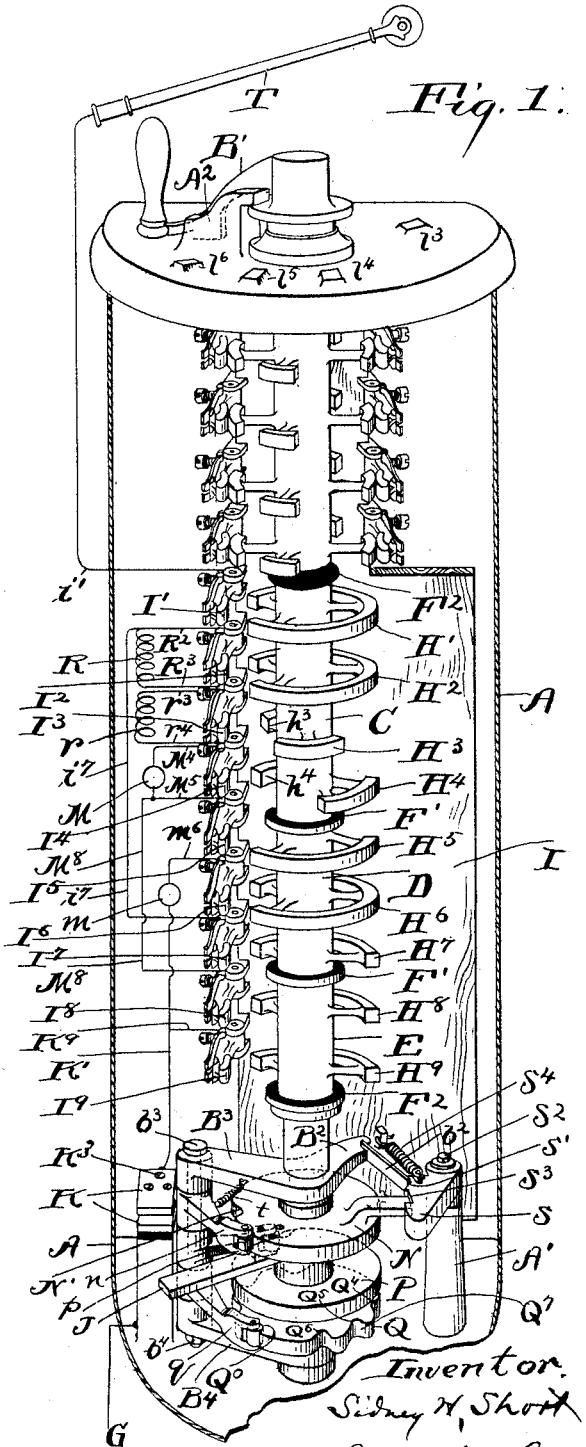

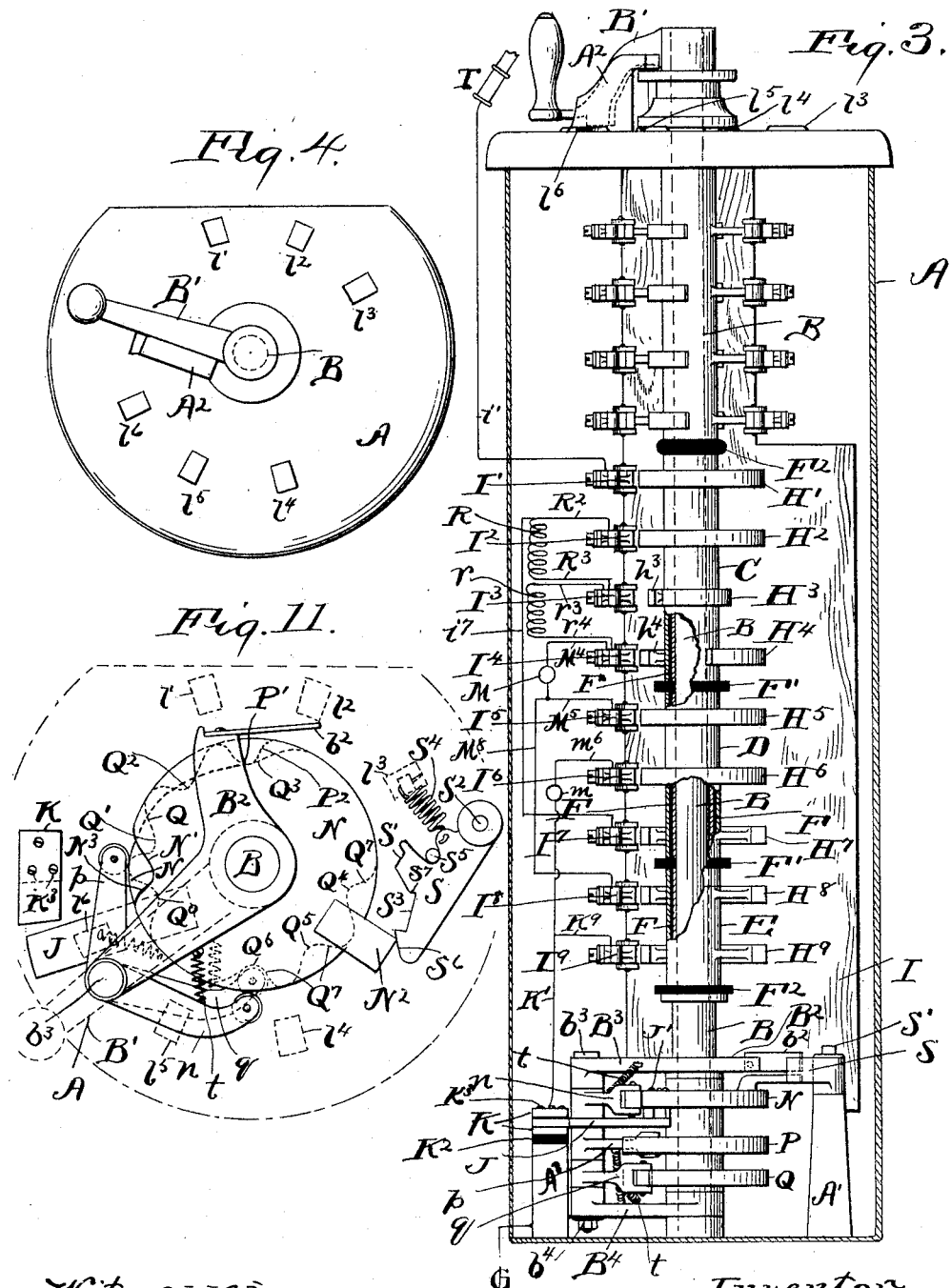

No. 629,398. Patented July 25, 1899.
S. H. SHORT.
CONTROLLER FOR ELECTRIC MOTOR CARS OR VEHICLES.
(Application filed Mar. 2, 1895.)
(No Model.) 4 Sheets—Sheet 3.
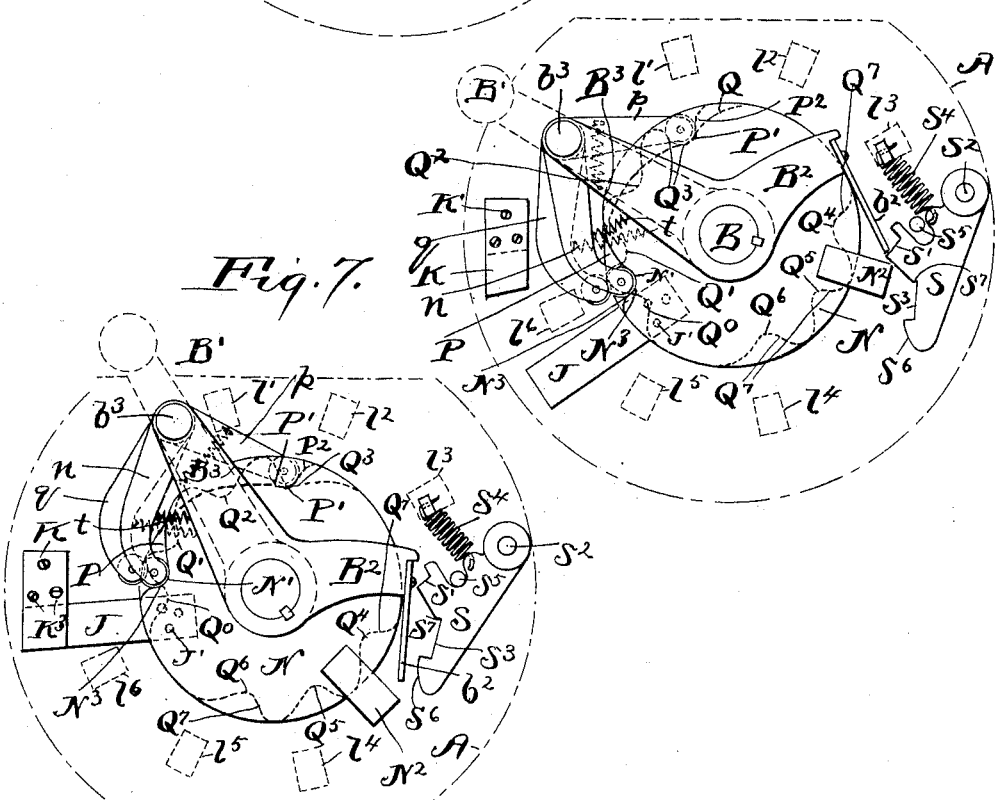

No. 629,398. Patented July 25, 1899.
S. H. SHORT.
CONTROLLER FOR ELECTRIC MOTOR CARS OR VEHICLES.
(Application filed Mar. 2, 1895.)

(No Model.) 4 Sheets—Sheet 4.

Witnesses.
E. B. Gilchrist

Inventor.
Sidney H. Short
By M. D. Leggett & Co.
his attorneys

UNITED STATES PATENT OFFICE.

SIDNEY H. SHORT, OF CLEVELAND, OHIO, ASSIGNOR TO THE WALKER COMPANY, OF NEW JERSEY.

CONTROLLER FOR ELECTRIC-MOTOR CARS OR VEHICLES.

SPECIFICATION forming part of Letters Patent No. 629,398, dated July 25, 1899.

Application filed March 2, 1895. Serial No. 540,291. (No model.)

*To all whom it may concern:*

Be it known that I, SIDNEY H. SHORT, of Cleveland, in the county of Cuyahoga and State of Ohio, have invented certain new and useful Improvements in Controllers for Electric-Motor Cars or Vehicles; and I do hereby declare the following to be a full, clear, and exact description of the invention, such as will enable others skilled in the art to which it pertains to make and use the same.

My invention relates to improvements in controllers for electric-motor cars or vehicles, and more especially to a controller wherein are employed a series of movable contacts operatively mounted upon an upright shaft and a series of relatively stationary contacts arranged in a vertical row adapted to be electrically engaged by the movable contacts and wherein the arrangement and length of the movable contacts are such that when the relatively stationary contacts are properly connected, respectively, with the trolley or contact device, motors, resistances, &c., of the motor car or vehicle the motors can, by properly manipulating a lever operatively connected with the aforesaid shaft, be connected in series with or without resistance in the circuit and can be changed from series to parallel relation with or without any resistance in the circuit. Sparking or arcing between the aforesaid movable and relatively stationary contacts upon breaking electrical connection between engaging contacts would soon burn or waste away the engaging surfaces of said contacts, necessitating the repairing or renewal of said contacts, and when several or quite a number of said contacts are employed, as in controllers of the character indicated, the arcing or sparking referred to would be a source of no inconsiderable expense and annoyance.

The primary object of my present invention is therefore to prevent arcing or sparking between the movable and relatively stationary contacts of the controller in breaking electrical engagement between said contacts; and with this object in view and to the end of attaining certain other advantages hereinafter referred to my invention consists in certain features of construction and combinations of parts hereinafter described, and pointed out in the claims.

Figure 10:
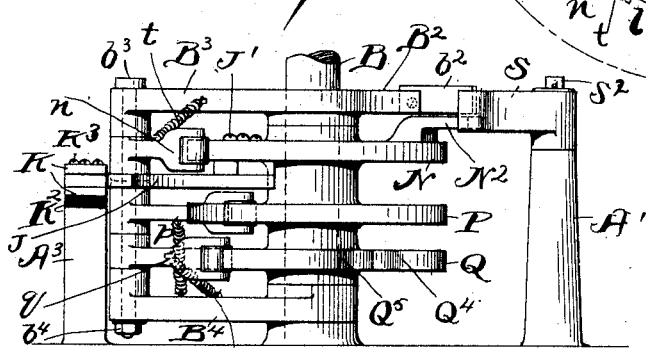

In the accompanying drawings, Figure 1 is a perspective showing the mechanism within a controller stand or case that I have devised for use on electric-motor cars or vehicles and showing in a diagrammatic manner the trolley or contact device of a railway-car, two resistances, two motors, and such electrical connections as are required between the trolley, resistances, motors, and relatively stationary contacts of the controller and showing means for preventing sparking or arcing between the movable and relatively stationary contacts of the controller. Fig. 2 is a diagrammatic view illustrating the different motor combinations adapted to be formed by means of the controller and diagrammatically exhibiting immediately below the illustration of said combinations the surfaces of the three groups of movable segments or contacts employed. Fig. 3 is a side elevation, partly in section, of the controller-case and features shown in Fig. 1. Fig. 4 is a top plan of the controller-case, showing the operating hand-lever and the index arranged upon said case in the path of the lever. Figs. 5, 6, 7, 8, and 9 are top plans showing circuit-breaker J, employed for preventing sparking or arcing between the engaging surfaces of the movable and relatively stationary contacts of the controller, and mechanism preferably employed in the actuation of the circuit-breaker, the top of the controller-case, in the lower portion of which said circuit-breaker is preferably located, and operating-lever being shown in dotted lines and the different figures exhibiting different positions, respectively, of the operating-lever and connected parts. Fig. 10 is a side elevation showing the circuit-breaker J and connected mechanism, contact K, and features hereinafter described. Fig. 11, on sheet containing Figs. 3 and 4, is a top plan corresponding with Figs. 5, 6, 7, 8, and 9, except in the position of the movable parts.

Referring to the drawings, A designates the case of the controller, centrally of which an upright shaft B is suitably supported. (See Figs. 1, 3, and 4.) Said shaft extends upwardly through case A and is provided with a hand-lever B' at the upper end thereof above case A. Three sleeves C, D, and E, arranged end to end, are rigidly mounted upon shaft B, C designating the uppermost sleeve, D the middle sleeve, and E the lowermost sleeve. All of said sleeves are electrically insulated from the shaft (see Fig. 3) by suitable insulating substance or material F, interposed between the sleeves and shaft. The sleeves are also electrically insulated from each other by suitable insulating substance or material F', interposed between opposing ends of the sleeves. Sleeve C at its upper end and sleeve E at its lower end are electrically insulated from the supporting-shaft by suitable insulating substance or material $F^2$. Each sleeve is provided with any suitable number of segmental contacts located at suitable intervals endwise of the supporting-sleeve and arranged concentrically with the axis of the supporting-shaft, said contacts being rigid with and preferably integral with the supporting-sleeve. Sleeve C is shown provided with six segmental contacts, (see Figs. 1 and 2,) marked H', $H^2$, $H^3$, $h^3$, $H^4$, and $h^4$, respectively, and all of said contacts except contacts $h^3$ and $h^4$ are arranged in different horizontal planes, respectively. Contact $h^3$ is arranged in the same horizontal plane with contact $H^3$ and contact $h^4$ is arranged in the same horizontal plane with contact $H^4$, as shown more clearly in the diagrammatic illustration in Fig. 2, wherein said contacts are shown laid out flat. Sleeve D is shown provided with three segmental contacts (marked $H^5$, $H^6$, and $H^7$, respectively,) and said contacts are arranged in different horizontal planes, respectively. Sleeve E is shown provided with two segmental contacts $H^8$ and $H^9$, respectively, arranged in different horizontal planes, respectively. The lengths and arrangement of the different segmental contacts are more clearly shown in the diagrammatic illustration in Fig. 2, upon reference to which it will be observed that contacts H', $H^2$, and $H^6$ have the same or approximately the same length and are arranged in the same vertical plane. Said contacts in the operation of the controller to turn on the electric power or to increase the power applied are moved in the direction of the arrows, and hence it will be observed that contacts $H^7$, $H^8$, and $H^9$ are located below the rear half of contact $H^6$, that contact $H^5$ is located above the forward half of contact $H^6$, that contacts $H^4$ and $h^4$ are arranged above the rear portions of contacts $H^5$ and $H^6$, respectively, and that contacts $H^3$ and $h^3$ are arranged above and a little forward of contacts $H^4$ and $h^4$, respectively.

A series of relatively stationary contacts is provided at one side of and a suitable distance from shaft B, said contacts being preferably arranged in a vertical row. (See Figs. 1 and 3.) Nine of said relatively stationary contacts I', $I^2$, $I^3$, $I^4$, $I^5$, $I^6$, $I^7$, $I^8$, and $I^9$ are provided in the case illustrated and are located adjacent to and adapted to be electrically engaged by movable segmental contacts H', $H^2$, $H^3$, $H^4$, $H^5$, $H^6$, $H^7$, $H^8$, and $H^9$, respectively, and contacts $I^3$ and $I^4$ are of course also adapted to be electrically engaged by segmental contacts $h^3$ and $h^4$, respectively. Contacts I', $I^2$, $I^3$, $I^4$, $I^5$, $I^6$, $I^7$, $I^8$, and $I^9$ are supported, preferably, from a board I, of wood or other insulating substance or material, suitably secured within the controller-case.

Now referring to the features diagrammatically illustrated in Figs. 1 and 3 it will be observed that stationary contact I' is electrically connected by wire $i'$ with the trolley or contact device T of the motor-car, that a resistance R has its opposite terminals electrically connected by wires $R^2$ and $R^3$ with contacts $I^2$ and $I^3$, respectively, that wire $R^2$, and consequently contact $I^2$, is electrically connected by means of wire $i^7$ with contact $I^7$, that another resistance $r$ has its opposite terminals electrically connected by wires $r^3$ and $r^4$ with contacts $I^3$ and $I^4$, respectively, that a motor M has its opposite terminals electrically connected by wires $M^4$ and $M^5$ with contacts $I^4$ and $I^5$, respectively, that wire $M^5$, and consequently motor M, is also electrically connected by wire $M^8$ with contact $I^8$, that another motor $m$ has its opposite terminals electrically connected by wires $m^6$ and K' with contacts $I^6$ and K, respectively, that contact K is suitably supported in the lower portion of, but electrically insulated from the controller-case, and that said wire K' is electrically connected by wire $K^9$ with contact $I^9$.

G designates a wire leading to ground or return-conductor and electrically connected with a circuit-breaker J, that is provided in the lower portion of the controller-case and closes or breaks the circuit between the motors and ground or return-conductor, according as said circuit-breaker is caused to electrically engage or disengage contact K.

On top of the controller-case is an index consisting of six marks—such, for instance, as lugs, (designated $l'$, $l^2$, $l^3$, $l^4$, $l^5$, and $l^6$, respectively,) which lugs or marks are arranged at suitable intervals in the path of the operating-lever and are formed in any suitable manner upon the top of the controller-case.

The arrangement of the movable segmental contacts hereinbefore referred to is such and the arrangement of lugs or marks $l'$, $l^2$, $l^3$, $l^4$, $l^5$, and $l^6$ is such relative to the arrangement of said contacts that different motor combinations are effected by bringing the operating-lever opposite the different lugs or marks $l'$, $l^2$, $l^3$, $l^4$, $l^5$, and $l^6$, respectively. For instance, by actuating said lever into position opposite lug or mark $l'$ the motor combination diagrammatically illustrated and marked $a$ in Fig. 2 is effected. Line L' in said Fig. 2 traverses the portions of segmental contacts H', $H^2$, $H^5$, and $H^6$ that make electrical connection with stationary contacts I', $I^2$, $I^5$, and $I^6$, respectively, when the operating-lever is moved opposite lug or mark $l'$ on the controller-case, resulting when the circuit is closed by the circuit-breaker J in the flow of the electric current from the trolley or contact device of the motor-car successively through stationary contact I', segmental contact H', segmental contact H², contact I², resistance R, contact I³, resistance $r$, contact I⁴, motor M, contact I⁵, contact I⁶, motor $m$, contact K, circuit-breaker J to ground, the motors being connected in series, as diagrammatically illustrated at $a$ in Fig. 2, with both resistances R and $r$ in circuit. Upon moving the operating-lever opposite lug or mark $l^2$ those portions of segmental contacts H', H², H³, H⁵, and H⁶ that are traversed by line L² in the diagrammatic illustration in Fig. 2 shall have been brought into electrical engagement with contacts I', I², I³, I⁵, and I⁶, respectively, resulting in the path of the current from contact I' successively through segmental contacts H', H², and H³, resistance $r$, contact I⁴, motor M, contact I⁵, segmental contacts H⁵ and H⁶, motor $m$ to contact K, &c., and placing the motors in series relation, as in Fig. 2, with resistance R out of circuit, as diagrammatically illustrated at $b$, Fig. 2. Upon bringing the operating-lever opposite lug or mark $l^3$ those portions of segmental contacts H', H², H⁴, H⁵, and H⁶ that are shown traversed by line L³ in the diagrammatic illustration in Fig. 2 shall have electrically engaged contacts I', I², I⁴, I⁵, and I⁶, respectively, and the current will pass from contact I' successively through contacts H', H², and H⁴, contact I⁴, motor M, contacts I⁵ and I⁶, motor $m$ to contact K, &c., retaining both motors in series relation, but with both resistances cut out of circuit, as diagrammatically illustrated at $c$, Fig. 2. When the operating-lever shall have been moved opposite lug or mark $l^4$, those portions of segmental contacts H', H², H⁶, H⁷, H⁸, and H⁹ that are traversed by line L⁴ in Fig. 2 shall have electrically engaged contacts I', I², I⁶, I⁷, I⁸, and I⁹, respectively, and current will pass from contact I' successively through contacts H', H², and I², resistance R, contact I³, resistance $r$, contact I⁴, motor M, contact I⁸, H⁸, H⁹, and I⁹ to contact K, &c., and current will also pass from contact I² successively through wire $i^7$, contacts I⁷, H⁷, H⁶, and I⁶, motor $m$, contact K, &c., resulting in the connection of the motors in parallel, as diagrammatically illustrated at $d$ in Fig. 2, with both resistances in the circuit through motor M. When the operating-lever is brought opposite lug or mark $l^5$, those portions of segmental contacts H', H², $h^3$, H⁶, H⁷, H⁸, and H⁹ that are traversed by line L⁵, Fig. 2, shall electrically engage contacts I', I², I³, I⁶, I⁷, I⁸, and I⁹, respectively, and current will pass from contact I' successively through contacts H', H², $h^3$, and I³, resistance $r$, contact I⁴, motor M, contacts I⁸, H⁸, H⁹, and I⁹, contact K, &c., and current will also pass from contact H² successively through contact I², wire $i^7$, contacts I⁷, H⁷, H⁶, and I⁶, motor $m$, contact K, &c., retaining both motors connected in parallel as diagrammatically illustrated at $e$, Fig. 2, with resistance R cut out of the circuit through motor M. Upon moving the operating-lever opposite lug or mark $l^6$ those portions of segmental contacts H', H², $h^4$, H⁶, H⁷, H⁸, and H⁹ that are shown traversed by line L⁶ in Fig. 2 shall have electrically engaged contacts I', I², I⁴, I⁶, I⁷, I⁸, and I⁹, respectively, and current will pass from contact I' successively through contacts H', H², $h^4$, and I⁴, motor M, contacts I⁸, H⁸, H⁹, and I⁹, contact K, &c., and current will also pass from contact H² successively through contact I², wire $i^7$, contacts I⁷, H⁷, H⁶, and I⁶, motor $m$, contact K, &c.—that is, the two motors will be connected in parallel and both resistances cut out of circuit, as illustrated diagrammatically at $f$, Fig 2.

The simplicity and convenience of the arrangement of the contacts and connections employed for changing the motors from a series to a parallel relation and for cutting one or both resistances out of circuit, are quite apparent.

If wire K' were permanently connected with the ground or return-conductor, it is obvious that sparking or arcing would take place between the movable segmental contacts and relatively stationary contacts whenever electrical connection was interrupted between adjacent movable and stationary contacts, and consequently the engaging surfaces of said contacts would soon be burned or wasted away and require to be repaired or replaced by new contacts, entailing expense and great inconvenience. I therefore provide the circuit-breaker J for interrupting and closing the circuit between contact K and the ground connection and provide means whereby said circuit-breaker is actuated to interrupt the circuit before electrically disengaging the movable contacts in circuit from the stationary contacts. To attain said operation of the circuit-breaker, to cause said circuit-breaker to complete the circuit before or approximately at the same time that the first motor combination is effected, and to compel the motorman or operative to turn the operating-lever to the place of beginning upon the backward or off movement of said lever, I provide, preferably, the following mechanism: Three disks N, P, and Q are loosely mounted upon shaft B in the lower portion of the controller-case. Said disks are rigid or integral with each other. N designates the upper disk, P the middle disk, and Q the lower disk. Disk N has a peripheral recess or depression N' and bears the circuit-breaker J, hereinbefore referred to. Disk P has a peripheral depression or recess P', and disk Q has as many peripheral recesses or depressions as and preferably one more than there are lugs or index-marks upon the top of the controller-case. Disk Q in the case illustrated has therefore seven peripheral depressions or recesses Q⁰, Q', Q², Q³, Q⁴, Q⁵, and Q⁶, respectively. Shaft B at any suitable point between disk N and the insulation F² at the lower end of sleeve E is provided with a laterally-extending arm B², that is operatively connected with the shaft in any approved manner, and which arm at or near its free or outer end is provided with a laterally-projecting finger $b^2$, adapted to engage a shoulder S', formed upon a latch S, and actuate said latch from an operative to an inoperative position. Latch S is fulcrumed at or near one end, as at S², to a stationary post or lug A', provided within the controller-case, and has a recess S³, that in the normal position of the latch and disks N, P, and Q is engaged by a laterally-projecting arm N² of disk N, and the latch consequently locks said disks in their normal position, wherein circuit-breaker J is electrically disconnected from contact K and interrupts the circuit between said contact and ground connection. A spring S⁴ acts to retain latch S in its normal or operative position, opposite ends of said spring being shown attached to the latch and controller-case, respectively. A stationary pin or stop S⁵, that the latch in its normal position engages, limits the action of the aforesaid spring. Shaft B is also provided with two laterally-extending arms B³ and B⁴, arm B⁴ being operatively connected with the shaft at any suitable point below disk Q and arm B³ being operatively connected with the shaft at any suitable point between disk N and adjacent insulation F². Three pawls $n, p,$ and $q$ are pivotally supported from and between the outer ends of arms B³ and B⁴, said pawls being preferably loosely mounted upon a bolt $b^3$, that extends through said arms and is secured against displacement by means of a nut $b^4$. Pawl $n$ is adapted to ride upon the periphery of disk N and engage the peripheral depression or recess in said disk. Pawl $p$ is adapted to ride upon the periphery of disk P and engage the peripheral recess or depression in said disk P. Pawl $q$ is adapted to ride upon the periphery of disk Q and engage the peripheral depressions or recesses in said disk Q. Each pawl in order to reduce the friction between it and the respective disk is at its free end provided with a roller that engages the disk and also facilitates the operation of the pawl. Each pawl is preferably provided with a spring $t$, applied in any suitable manner and acting in the direction to retain the pawl in engagement with the engaging disk. The operation of the mechanism just hereinbefore described is very clearly shown in Figs. 5 to 11, inclusive, and I would here remark that the position of the moving parts exhibited in Fig. 10 corresponds to the position of the movable parts shown in Fig. 5. The operating-lever in order to close the circuit in the operation of the controller is moved to the right out of engagement with a lug A², formed on the top of the controller-case, which lug is engaged by the lever in its normal or off position and prevents the movement of the lever beyond its extreme position in either direction. The arrangement of parts is such that with the operating-lever in its off position the circuit shall be broken, as shown in Fig. 5, and arm N², and consequently disks N, P, and Q and circuit-breaker J, shall be locked by latch S against movement in the direction to effect the closing of the circuit between contact K and ground or return-conductor, and finger $b^2$ of arm B² shall be in the position required preparatory to actuating said latch into an inoperative position against the action of spring S⁴. The opposing side walls of the peripheral recesses or depressions in disks N, P, and Q divergingly slope toward the concentric portion of the periphery of the respective disks. The slope of one of the side walls of the recess in disk P—viz., wall P²—that faces in a direction opposite to the direction in which the operating-lever is moved in closing the circuit is quite sudden, whereas the other side wall of said recess is very gradual. The slope of one of the side walls of the recess in disk N—viz., wall N³—that faces in the direction in which the operating-lever is moved in closing the circuit is quite sudden, whereas the other side wall of said recess is very gradual. Similarly, one of the side walls of each peripheral recess Q', Q², Q³, Q⁴, Q⁵, and Q⁶ in disk Q—viz., side wall Q⁷—that faces in the direction in which the operating-lever is turned in closing the circuit should be quite sudden, all whereof will hereinafter more fully appear. The arrangement of parts is such that in their normal position, when the circuit is broken and the operating-lever is in its extreme off position or at the place of beginning and engages lug A² on the controller-case, arm N² of disk N shall engage the recess in latch S; finger $b^2$ of arm B² shall be in position engaging and ready to release arm N², and consequently disks N P Q and the circuit-breaker; the free or roller-bearing end of pawl $p$ shall be upon the gradually-sloping wall of the peripheral recess in disk P, a suitable distance from the suddenly-sloped wall P² of said recess; the free or roller-bearing end of pawl $n$ shall be at, or approximately at, the outer end of the suddenly-sloped wall N³ of the peripheral recess in disk N, and the free or roller-bearing end of pawl $q$ shall be in engagement with recess Q⁰ in disk Q and so that when the operating-lever is turned in the direction required to close the circuit, but before it shall have come opposite lug or mark $l'$ on the controller-case, finger $b^2$ of arm B² of the controller-shaft shall have engaged and actuated latch S out of engagement with arm N² of disk N, and the roller-bearing end of pawl $p$ shall have engaged wall P² of the peripheral recess in disk P, as shown in Fig. 6, so that a further movement of the lever in the same direction, (see Fig. 7,) and consequently the further accompanying of said pawl, shall effect the actuation of disk P, and consequently disks N and Q, in the direction required to bring circuit-breaker J into electrical engagement with contact K, and thereby close the circuit. The arrangement of parts is, furthermore, such that before the operating-lever shall have come opposite lug or mark $l'$ on the controller-case, circuit-breaker J shall have electrically engaged contact K, the free or roller-bearing end of pawl $n$ shall have dropped into the peripheral recess of disks N immediately adjacent or contiguous to wall $N^3$ of said recess, as shown in Fig. 7, and the free or roller-bearing end of pawl $q$ shall be on its way from recess $Q^0$ in disk Q to recess $Q'$ in said disk. The arrangement of parts is, furthermore, such that when circuit-breaker J shall have electrically engaged contact K, and thereby closed the circuit, it shall come into engagement with a stop whose function is to limit the movement of the circuit-breaker, and consequently disks N, P, and Q, in the direction in which the operating-lever is moved in closing the circuit, which stop in the case illustrated is formed by the lug or post $A^3$ that supports contact K, and from which lug or post contact K is electrically insulated by any suitable insulating substance or material $K^2$.

By the construction hereinbefore described it will be observed that pawls $n$ and $q$ move idly upon the peripheries of the engaging disks during the actuation of the operating-lever in the direction in which said lever is moved in bringing circuit-breaker J into electrical engagement with contact K and that pawl $p$ moves idly upon the peripheral surface of disk P when the movement of said disks in the direction indicated has been arrested by stop $A^3$. The arrangement of parts is, furthermore, such that pawl $q$ shall have occupied recess $Q'$ in disk Q when the operating-lever has been moved opposite lug or mark $l'$ on the controller-case, and that said pawl shall move from one recess to the next or one of the next adjacent recesses in said disk, according as the operating-lever is moved from one lug or mark to the corresponding adjacent lug or mark on the controller-case—that is, said pawl shall have occupied recess $Q'$ or recess $Q^2$ or recess $Q^3$ or recess $Q^4$ or recess $Q^5$ or recess $Q^6$, according as the operating-lever has been brought opposite lug or mark $l'$ or mark $l^2$ or mark $l^3$ or mark $l^4$ or mark $l^5$ or mark $l^6$ on the controller-case—and said pawl shall be in position to engage the suddenly-sloped wall $Q^7$ of any one of said recesses when the operating-lever has been brought opposite the lug or mark that is identified with said recess, so that when the motorman or operative turns the operating-lever backwardly, as required to change the connection of the motors in parallel to a series connection, or as required in changing from a circuit without resistances to one including resistance, or from a circuit containing one of the resistances to a circuit including both resistances, which movement of the lever would be accompanied by the electrical disconnection of one or more of the movable segmental contacts upon shaft B from the relatively stationary contacts, the aforesaid disk Q, and consequently disks N and P, shall, by means of pawl $q$, be turned backwardly in the direction required to electrically disconnect circuit-breaker J from contact K, as shown in Fig. 11, (on sheet containing Figs. 3 and 4,) and thereby interrupt the circuit before any electrical disengagement between the aforesaid segmental contacts and relatively stationary contacts takes place, whereby sparking or arcing between the engaging contacts when electrical connection between them is interrupted is successfully avoided and instead but a single arc or spark is produced between the aforesaid circuit-breaker and contact K upon the aforesaid interruption of their electrical connection with each other. The expense and work incurred of renewing or repairing contact K and circuit-breaker J is very inconsiderable as compared with the expense and annoyance that would be occasioned if sparking or arcing were allowed between the segmental contacts upon shaft B and adjacent stationary contacts. The location of contact K and circuit-breaker J in the lower portion of the controller-case affords convenient access to said parts, and said contact and said circuit-breaker are removably secured, preferably by means of screws, to the supporting member $K^3$, designating the screws that secure contact K to its support $A^3$, and J' representing the screws that secure circuit-breaker J to the supporting-disk N. The arrangement of parts is, furthermore, such that upon the aforesaid actuation of circuit-breaker J out of electrical engagement with contact K arm $N^2$ of disk N shall come into engagement with an incline $S^6$, formed upon the free or outer end of latch S, and thereupon actuates said latch in the direction required to accommodate the movement of said arm into recess $S^3$ in the latch and into engagement with a stop for limiting the further movement of said arm, and consequently the connected disks, beyond their normal position, said stop being preferably formed by one, $S^7$, of the side walls of the aforesaid recess. Pawl $q$ upon the return of said disks and circuit-breaker into their normal position will, during the further actuation of the operating-lever that may be required to bring said lever into its extreme off position or toward said position, move idly upon the periphery of the engaging disk Q. It will, however, be observed that the motorman or operative, if he has not already moved the operating-lever into or approximately into its off position upon effecting electrical disconnection between circuit-breaker J and contact K, will, as soon as the circuit-breaker and connected disks N, P, and Q have been brought into their normal position and locked in such position by latch S, be compelled to return the operating-lever into or approximately into said position before he can again establish electrical connection between circuit-breaker J and contact K, as required to close the circuit, and hence it will be observed that by my improved construction I successfully avoid the liability of discommoding or arousing the profanity of a passenger or disarranging or injuring some portion of the electrical equipment of the car, which liability would attend the car jerking or shocks resulting from too suddenly starting the car, and which shocks or jerking of the car would occur if the operative were not compelled to and did not return the operating-lever to or approximately to the starting position before again applying the motive power. It will be apparent, however, that pawl $q$, when the operative has actuated the operating-lever from its extreme off position toward the first lug or mark $l'$ on the controller-case, as shown in Fig. 7, and has effected electrical connection between circuit-breaker J and contact K or has moved the operating-lever sufficiently far to release the circuit-breaker-bearing disk, as shown in Fig. 6, and desires or finds it necessary for some reason or other to return said parts into their normal position before he has established connection of the motors in series, will be in a position between recesses $Q^0$ and $Q'$ in the periphery of disk Q and in a position that would render said pawl $q$ incapable of returning disk Q and connected parts upon the backward movement of the operating-lever into their normal position. During the time referred to, therefore, pawl $n$ is called into requisition and the arrangement of parts is such that as soon as the operating-lever is moved from its extreme off position toward the first lug or mark $l'$ on the controller-case said pawl $n$ will drop into recess $N'$ in the periphery of disk N in position to engage side wall $N^3$ of said recess, and consequently in position to actuate disk N and connected parts into their normal position upon turning the operating-lever backwardly at the time indicated.

What I claim is—

1. The combination with the trolley or contact device T, motors M $m$, resistances R $r$ and ground or return conductor, of a controller comprising an upright shaft B, a group of contacts $H'$, $H^2$, $H^3$, $h^3$, $H^4$, $h^4$, electrically connected with each other and operatively connected with the shaft, and contacts $H^8$ and $H^9$ electrically connected with each other and operatively connected with the shaft, said contacts being electrically insulated from the shaft, contacts $H^8$, $H^9$, being electrically insulated from the aforesaid groups of contacts, and said groups of contacts being electrically insulated from each other, relatively stationary contacts $I'$, $I^2$, $I^3$, $I^4$, $I^5$, $I^6$, $I^7$, $I^8$, and $I^9$ arranged in an upright row and in suitable proximity to the aforesaid movable contacts, and wires or connections $i'$ $i^7$, $R^2$, $R^3$, $r^3$, $r^4$, $M^4$, $M^5$, $M^8$, $m^6$, $K'$ and $K^9$, all arranged and operating substantially as indicated, and means for electrically connecting wire or connection $K'$ with ground or return conductor, and a switch for breaking the circuit in advance of the interruption of electrical connection between said stationary and movable contacts, said switch arranged to be actuated by said shaft and adapted to maintain the circuit broken until the parts are in their "off" position, substantially as set forth.

2. The combination with the trolley or contact device T, motors M $m$, two resistances R, $r$, and ground or return conductor, of a controller comprising an upright case A, closed at the top, an upright shaft B arranged within said case and extending upwardly through the top of the case, lever $B'$ operatively connected with the upper end of said shaft above the controller-case, lug or stop $A^2$ formed upon the aforesaid case, and lugs or marks $l'$, $l^2$, $l^3$, $l^4$, $l^5$, $l^6$ upon said top at suitable intervals about the axis of the shaft, a group of contacts $H'$, $H^2$, $H^3$, $h^3$, $H^4$, $h^4$, electrically connected with each other and operatively connected with the shaft, a group of contacts $H^5$, $H^6$ and $H^7$ electrically connected with each other and operatively connected with the shaft, and contacts $H^8$ and $H^9$ electrically connected with each other and operatively connected with the shaft, said contacts being electrically insulated from the shaft, contacts $H^8$, $H^9$, being electrically insulated from the aforesaid groups of contacts, and said groups of contacts being electrically insulated from each other, relatively stationary contacts $I'$, $I^2$, $I^3$, $I^4$, $I^5$, $I^6$, $I^7$, $I^8$ and $I^9$ arranged in an upright row and in suitable proximity to the aforesaid movable contacts, and wires or connections $i'$, $i^7$, $R^2$, $R^3$, $r^3$, $r^4$, $M^4$, $M^5$, $M^8$, $m^6$, $K^8$ and $K^9$, all arranged and operating substantially as indicated, and means for electrically connecting wire or connection $K'$ with the ground or return conductor, and a switch for breaking the circuit in advance of the interruption of electrical connection between said stationary and movable contacts, said switch arranged to be actuated by said shaft and adapted to maintain the circuit broken until the parts are in their "off" position, substantially as set forth.

3. The combination with the trolley or contact device T, two motors M $m$, resistances R, $r$, and ground connection, of a controller comprising a case A, closed at the top, a suitably-actuated upright shaft B, said shaft extending upwardly through the top of the controller-case, six lugs or marks $l'$ $l^2$, $l^3$, $l^4$, $l^5$, $l^6$, formed upon said top at suitable intervals about the axis of the shaft, lever $B'$ operatively connected with said shaft above the aforesaid top, three sleeves C, D and E operatively mounted upon said shaft, said sleeves being electrically insulated from the shaft and electrically insulated from one another, segmental contacts $H'$, $H^2$, $H^3$, $h^3$, $H^4$, $h^4$, rigid and electrically connected with sleeve C, segmental contacts $H^5$, $H^6$ and $H^7$ rigid and electrically connected with sleeve D, segmental contacts $H^8$ and $H^9$ rigid and electrically connected with sleeve E, the upright series of relatively stationary contacts $I'$, $I^2$, $I^3$, $I^4$, $I^5$, $I^6$, $I^7$, $I^8$, $I^9$ adapted to be engaged by the aforesaid segmental contacts, and such connections between the aforesaid trolley or contact device, resistances, motors, ground connection and stationary contacts, and the arrangement of the lugs or marks on the top of the controller-case and contacts being such, that the motors are connected in series with both, or one only, or not any of the resistances in circuit, or are connected in parallel with both, or only one, or not any of the resistances in circuit, according as the operating-lever is brought opposite to lug or mark $l'$ or $l^2$, or $l^3$, or $l^4$, or $l^5$ or $l^6$, respectively, and a switch for breaking the circuit in advance of the interruption of electrical connection between said stationary and movable contacts, said switch arranged to be actuated by said shaft and adapted to maintain the circuit broken until the parts are in their "off" position, substantially as set forth.

4. The combination with a controller for an electric car or vehicle, which controller comprises a suitably-actuated shaft, a series of suitably-arranged contacts operatively connected with said shaft and a series of relatively stationary contacts adapted to be electrically engaged by the contacts on the shaft, of a contact K located in the line of the circuit, circuit-breaker located in the line of the circuit and adapted to electrically engage the aforesaid contact K, the circuit-breaker normally being out of engagement with said contact, means operatively connected with the shaft for actuating the circuit-breaker into electrical engagement with contact K, means operatively connected with the shaft for electrically disengaging the circuit-breaker from said contact preparatory to the interruption of the electrical engagement between contacts of the aforesaid two series of contacts, means for locking the circuit-breaker in its normal position, means operatively connected with the shaft for actuating said locking means to unlock or release the circuit-breaker, and means acting to retain the locking means in its operative position, substantially as and for the purpose set forth.

5. The combination with a controller of an electric car or vehicle, which controller comprises a suitably-actuated shaft, a series of suitably-arranged contacts operatively connected with said shaft, a series of relatively stationary contacts adapted to be electrically engaged by the contacts on the shaft, of a contact K located in the line of the circuit, disk or member N loosely mounted upon the aforesaid shaft adjacent to the aforesaid contact K, and having a laterally-projecting arm $N^2$, circuit-breaker rigid with said loosely-mounted disk or member and located in the line of the circuit, said circuit-breaker adapted to electrically engage the aforesaid contact K and thereby close the circuit, a latch adapted to operatively engage the aforesaid arm or projecting member of the circuit-breaker-supporting member, a spring acting to retain said latch in its normal or operative position, means operatively connected with the shaft for actuating the circuit-breaker-supporting member in the direction required to move the circuit-breaker into electrical engagement with contact K, and means operatively connected with the shaft for actuating said supporting member in the direction required to interrupt electrical connection between said contact and circuit-breaker, all arranged and operating substantially as and for the purpose set forth.

6. The combination with a controller for an electric car or vehicle, which controller comprises a case A, a suitably-actuated upright shaft within said case, a series of suitably-arranged contacts operatively connected with said shaft and a series of relatively stationary contacts adapted to be electrically engaged by the contacts on the shaft, of a contact K located in the lower part of the aforesaid case in the line of the circuit, a disk or member N loosely mounted upon the shaft adjacent to said contact, said loosely-mounted disk or member being provided with a laterally-projecting arm $N^2$, circuit-breaker J rigid with said loosely-mounted disk or member and located in the line of the circuit, said circuit-breaker being adapted to electrically engage contact K, and thereby close the circuit, a latch S adapted to engage the aforesaid arm of the circuit-breaker-supporting member and lock the circuit-breaker in its normal position, a spring acting to retain said latch in its operative position, means operatively connected with the shaft for actuating said latch into an inoperative position, means operatively connected with the shaft for actuating the circuit-breaker-supporting member in the direction required to establish electrical engagement between the circuit-breaker and contact K, and means operatively connected with the shaft for actuating the circuit-breaker-supporting member in the direction required to interrupt electrical connection between said circuit-breaker and contact, all arranged and operating substantially as and for the purpose set forth.

7. The combination with a controller of an electric car or vehicle, which controller comprises a suitably-actuated shaft, a series of suitably-arranged contacts operatively connected with said shaft, a series of relatively stationary contacts adapted to be electrically engaged by the contacts on the shaft, of a contact K located in the line of the circuit, disks or members N, P and Q loosely mounted upon the shaft, member N provided with recess N' and laterally-projecting arm $N^2$; circuit-breaker J rigid with said member N and located in the line of the circuit, said circuit-breaker being adapted to electrically engage the aforesaid contact K, member P having a peripheral recess P', and member Q being provided with peripheral recesses Q', $Q^2$, $Q^3$, $Q^4$, $Q^5$, and $Q^6$; pawls $n$, $p$ and $q$, operatively connected with the shaft; springs $t$; latch S; spring $S^3$, and arm $B^2$ operatively connected with the shaft and provided with finger $b^2$, all arranged and operating substantially as shown, for the purpose specified.

8. In a controller for electric motors, circuit-changing and resistance-varying stationary and movable contacts in combination with a switch and a controlling connection actuated by the movement of said movable contacts in one direction to close said switch and by the opposite movement to open the same, the first-named position of said switch being maintained during the variation of resistance in the circuit and the second position being maintained during a reverse movement at the resistance-varying contacts, as and for the purpose set forth.

In testimony whereof I sign this specification, in presence of two witnesses, this 30th day of January, 1895.

SIDNEY H. SHORT.

Witnesses:
FRANK BILLINGS,
Z. M. HUBBELL.